(12) United States Patent
Bogaerts

(10) Patent No.: US 12,084,380 B2
(45) Date of Patent: Sep. 10, 2024

(54) GLASS COMPOSITION WITH NICKEL TO REDUCE ENERGY CONSUMPTION DURING ITS MELTING STEP

(71) Applicant: AGC GLASS EUROPE, Louvain-la-Neuve (BE)

(72) Inventor: Michel Bogaerts, Braine-le-Chateau (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 995 days.

(21) Appl. No.: 16/975,518

(22) PCT Filed: Feb. 15, 2019

(86) PCT No.: PCT/EP2019/053881
§ 371 (c)(1),
(2) Date: Aug. 25, 2020

(87) PCT Pub. No.: WO2019/166247
PCT Pub. Date: Sep. 6, 2019

(65) Prior Publication Data
US 2020/0399164 A1    Dec. 24, 2020

(30) Foreign Application Priority Data

Feb. 28, 2018   (EP) ..................... 18159205

(51) Int. Cl.
*C03C 3/087*   (2006.01)
*C03C 13/00*   (2006.01)

(52) U.S. Cl.
CPC ............ *C03C 3/087* (2013.01); *C03C 13/00* (2013.01); *C03C 2213/00* (2013.01)

(58) Field of Classification Search
CPC ......... C03C 3/076; C03C 3/078; C03C 3/083; C03C 3/085; C03C 3/087; C03C 3/089; C03C 3/091; C03C 3/093; C03C 13/00; C03C 13/001; C03C 13/002; C03C 13/06
See application file for complete search history.

(56) References Cited

U.S. PATENT DOCUMENTS

| | | | |
|---|---|---|---|
| 5,204,293 A | 4/1993 | Amundson, Jr. et al. | |
| 2017/0334765 A1* | 11/2017 | Wada | ....................... C03C 3/087 |
| 2018/0066814 A1* | 3/2018 | Arai | ....................... C03C 3/087 |
| 2018/0297888 A1* | 10/2018 | Nagai | ..................... C03C 4/085 |

FOREIGN PATENT DOCUMENTS

| | | | | |
|---|---|---|---|---|
| GB | 545190 A | 5/1942 | | |
| WO | WO 95/13993 A1 | 5/1995 | | |
| WO | WO-2016148026 A1 * | 9/2016 | ............. | C03C 3/083 |
| WO | WO-2016181864 A1 * | 11/2016 | ............. | C03C 3/085 |
| WO | WO-2017094869 A1 * | 6/2017 | ............. | C03C 3/083 |

OTHER PUBLICATIONS

International Search Report issued on Apr. 17, 2019 in PCT/EP2019/053881 filed on Feb. 15, 2019.
Coenen, V. M. "Durchstrahlung des Glasbades bei Farbgläsern," Glastechnische Berichte, Deutschen Glastechnischen Gesellschaft E.V., vol. 41, No. 1, Jan. 1968, pp. 1-10, XP009507250 (8 total pages).

\* cited by examiner

*Primary Examiner* — Elizabeth A. Bolden
(74) *Attorney, Agent, or Firm* — Oblon, McClelland, Maier & Neustadt, L.L.P.

(57) ABSTRACT

A glass composition with low thermal radiative conductivity at high temperature has the following components in weight percentage, expressed with respect to the total weight of the glass composition: $SiO_2$ 50-85%; $Al_2O_3$ 0-30%, $B_2O_3$ 0-20%; $Na_2O$ 0-25%; CaO 0-25%; MgO 0-15%; $K_2O$ 0-20%; BaO 0-20%; $Fe_2O_3$ total 0.002-0.1%. The glass also includes NiO at a level of 0.0001% to 0.0020% by weight of the total glass composition.

20 Claims, 3 Drawing Sheets

GLASS COMPOSITION WITH NICKEL TO REDUCE ENERGY CONSUMPTION DURING ITS MELTING STEP

TECHNICAL FIELD OF THE INVENTION

The present invention relates to a glass composition comprising nickel to reduce energy consumption during its melting step.

DESCRIPTION OF THE PRIOR ART

Reduction of energy consumption in glass industrial melting furnaces is a major issue, both from an economical and from an environmental point of view. Improvements of the industrial production process steps such as further furnace insulation, optimization of the combustion, . . . have already been developed. Further improvements on the process steps would however require substantially more expensive investments. Another route to reduce the energy consumption would be to work on the glass compositions themselves, by lowering the melting temperature of the glass composition. The melting temperature is defined as the temperature at which the glass viscosity is 10 PaS. The melting temperature is therefore lowered by lowering the viscosity of glass composition at high temperature. Thereby, the energy to be supplied to the furnace can be decreased.

Recently, "ultra-white" or "extra-clear" glasses tend to be preferred in the solar or building domains, due to their high luminous and/or energetical transmittance. These glasses contain low amount of iron and are thereby also often called "low-iron glasses". For industrial soda-lime glass, low-iron glasses are characterized by a total iron content, expressed as $Fe_2O_3$ total, below approximately 0.1 wt %, generally below 600 ppm. However, these low-iron glass compositions are characterized by a high radiative thermal conductivity and therefore are difficult to heat by radiations in the wavelengths emitted inside the glass furnace. For these low-iron glass compositions, an increase of the radiation absorption by the molten glass at high temperature would be highly beneficial in term of energy consumption.

The reduction of the melting temperature of glass compositions has been considered in the art: U.S. Pat. No. 5,071,796 discloses a window glass composition wherein $SiO_2$ has been by partially replaced by $Na_2O$ and $Al_2O_3$ resulting in a decrease of the high temperature viscosity. WO 2014/128714 proposes to replace about half of the silica content, and partially or totally the calcium oxide content, by a boron component. However, it is difficult to maintain the glass properties such as fining temperature, glass transition temperature, glass durability or optical properties of such highly modified compositions. Furthermore, some of the alternative components might be substantially expensive and thereby limit their industrial applications.

Glass compositions comprising nickel are known in the art. Please refer for example to US2013/0316162, US2014/0017500, U.S. Pat. No. 3,881,905 describing glass or tempered glass for display panels; and to U.S. Pat. No. 5,888,917 disclosing transparent haze free colored glasses.

Therefore, it is an object of the present invention to provide in a cost-effective manner, a low-iron glass composition with low thermal radiative conductivity at high temperature to reduce the energy consumption of the production process, without impairing the properties of the glass composition.

SUMMARY OF THE INVENTION

The present invention relates to a glass composition comprising the following components in weight percentage, expressed with respect to the total weight of the glass composition:

| | |
|---|---|
| $SiO_2$ | 50-85% |
| $Al_2O_3$ | 0-30% |
| $B_2O_3$ | 0-20% |
| $Na_2O$ | 0-25% |
| CaO | 0-25% |
| MgO | 0-15% |
| $K_2O$ | 0-20% |
| BaO | 0-20% |
| $Fe_2O_3$ total | 0.002-0.1% | wherein said glass composition further comprises nickel, expressed as NiO, at a level of 0.0001% to 0.0020% by weight.

The present invention further relates to a glass article made from said glass composition, in particular in the form of a glass sheet, a hollow glass article or a glass fiber.

The invention also relates to the use of nickel to reduce energy consumption during the melting step of a glass composition according to the invention.

BRIEF DESCRIPTION OF THE DRAWINGS

FIG. 1B further shows the emissivity gradient ($dE_\lambda/dT$) of a black body as a function of the same wavelengths at the temperature of 1200° C.

DETAILED DESCRIPTION OF THE INVENTION

Figure 1:
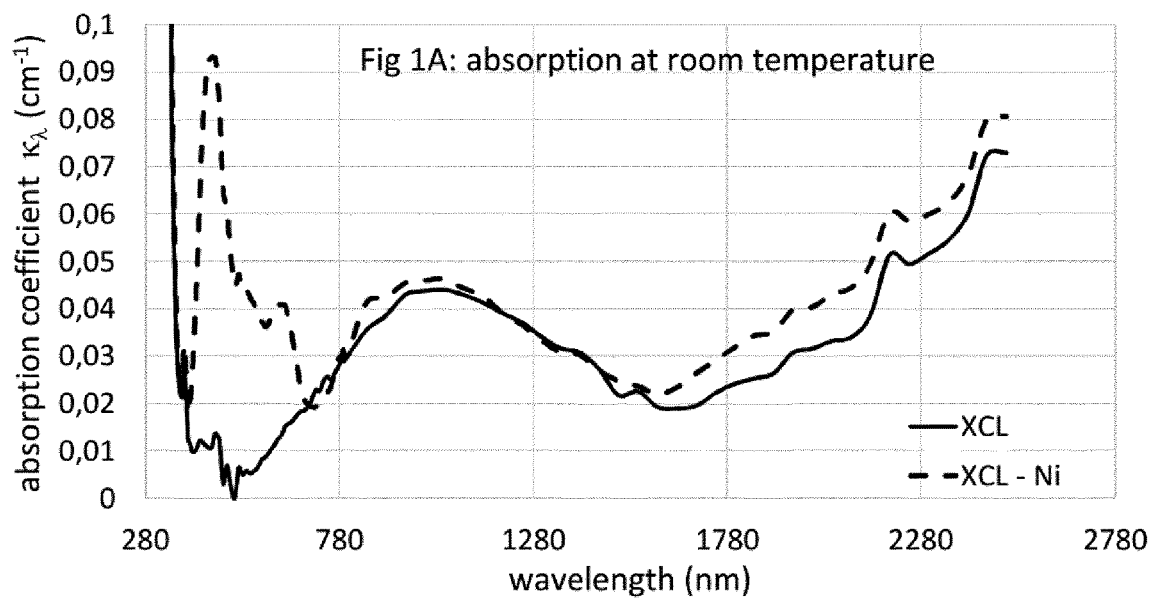
FIG. 1A shows the absorption coefficient (KA) of a prior art glass composition (XCL) and of a composition of the present invention (XCL-Ni) as a function of the wavelength, at room temperature.
FIG. 1B shows the absorption coefficient (KA) of the same prior art glass composition (XCL) and composition of the present invention (XCL-Ni) as un function of the wavelength, at 1200° C.
Figure 1:
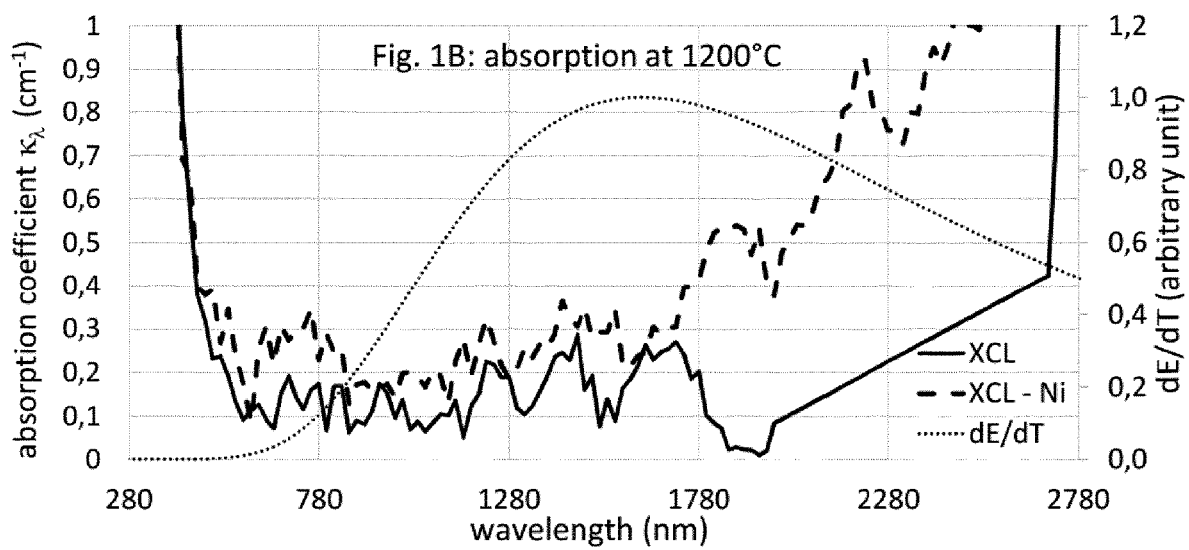

It is an object of the present invention to provide a low-iron glass composition with low thermal radiative conductivity to reduce energy consumption during the production process. It has been surprisingly found that adding a small amount of nickel to a low-iron glass composition, allows to substantially reduce the thermal radiative conductivity while maintaining the mechanical properties, viscosity and chemical durability of the glass composition, in a cost-effective manner.

Throughout the present text, when a range is indicated, the extremities are included. In addition, all the integral and subdomain values in a numerical range are expressly included as if explicitly written. Also, throughout the present text, the values of content are as percentages by weight, that is to say expressed with respect to the total weight of the glass, unless explicitly specified otherwise (for example, in ppm). Throughout the present text, the iron content is total and expressed as $Fe_2O_3$, unless explicitly specified otherwise.

The glass composition of the present invention comprises nickel, expressed as NiO, at a level of 0.0001% to 0.0020% by weight.

In a preferred embodiment, the glass composition of the present invention comprises nickel, expressed as NiO, at a level ≤0.0018%, preferably ≤0.0015%, more preferably ≤0.0010%, ideally ≤0.0008% by weight.

In another preferred embodiment, the glass composition of the present invention comprises nickel, expressed as NiO, at a level ≥0.0002%, more preferably ≥0.0003% or even >0.0005% by weight.

The glass composition of the present invention comprises total iron (expressed as $Fe_2O_3$) at a level of 0.002% to 0.1% by weight. In a preferred embodiment, the glass composition comprises total iron, expressed as $Fe_2O_3$, at a level of 0.002% to 0.06%, preferably 0.002% to 0.04%, more preferably 0.002% to 0.02% by weight.

The present invention addresses the technical challenge of formulating a glass composition with low thermal radiative conductivity at high temperature, by decreasing the radiative conductivity coefficient ($k_r$) and therefore by increasing the absorption coefficient ($\kappa_\lambda$) of the glass composition in the wavelengths corresponding to the energy radiated in the melting furnace at the temperature reached in said furnace. It has been surprisingly found that the addition of low amount of nickel to a glass composition with relatively low amount of total iron provides such low thermal radiative conductivity. Furthermore, this technical solution whereby the composition is only slightly modified, allows to maintain the mechanical and chemical properties of the glass composition.

The radiative transfer in molten glass composition can be evaluated by the Rosseland approximation based on the assumption that photons propagation can be simulated by a diffusion law, i.e. that the energy flux F is proportional to the thermal gradient $\partial T/\partial z$, where z in the glass height, with a proportionality factor $k_r$ being the radiative thermal conductivity coefficient, as per equation I.

$$\partial T/\partial z = F/k_r. \quad \text{(Equation I)}$$

The radiative thermal conductivity coefficient $k_r$, can be calculated by summing, at all wavelengths, the emissivity gradient, $\partial E_\lambda/\partial T$, (being the rate of change of the emissivity with temperature) with the inverse of the absorption coefficient $\kappa_A$ as per equation II below. For the purpose of the present invention, the emissivity $E_\lambda$ emitted in the furnace is assimilated to a black body.

$$k_r = \frac{4}{3} \int_0^\infty \frac{1}{\kappa_\lambda} \frac{\partial E_\lambda}{\partial T} d\lambda$$

It has been found that to improve the heat transfer to the molten glass within a low-iron glass composition, the thermal gradient, $\partial T/\partial z$, within equation I is to be increased. This can be achieved by decreasing the radiative thermal conductivity coefficient $k_r$, of the glass composition and therefore by increasing its absorption coefficient $\kappa_\lambda$. Moreover, it has been found that the absorption curve of the glass composition must match as much as possible the emissivity gradient of the energy radiations emitted in the furnace in order to have a substantial impact on the radiative thermal conductivity.

The absorption coefficients, $\kappa_\lambda$, of compositions of the prior art and of the invention—as per table 1 below, were measured at room temperature and at a high temperature. The high temperature corresponds to the temperature usually reached in glass melting furnace.

TABLE 1

| Reference | Composition of the XCL | Composition of the present XCL-Ni |
|---|---|---|
| $SiO_2$ (wt %) | 73.0 | 73.0 |
| $Al_2O_3$ (wt %) | 0.03 | 0.03 |
| CaO (wt %) | 8.25 | 8.25 |
| MgO (wt %) | 4.5 | 4.5 |
| $Na_2O$ (wt %) | 13.9 | 13.9 |
| $K_2O$ (wt %) | 0.01 | 0.01 |
| $SO_3$ (wt %) | 0.32 | 0.32 |
| $Fe_2O_3$ tot (wt %) | 0.0102 | 0.0102 |
| Ni (ppm) | 0 | 19 |

The absorption coefficient was measured in a laboratory, according to the following method: A specific spectrometer was designed to measure transmission from 250 to 2800 nm at high temperature. A temperature of 1200° C. has been chosen as representative of the temperature reached in the furnace. The sources of radiations are xenon and halogen lamp (from 250 to 2000 nm) and a ceramic element for wavelengths above 2000 nm. The radiation is modulated and split in two beams to enter into the lab furnace. The optical path of one of the beam is dedicated to the measurement of the transmission of the glass sample, the other beam does not pass through the sample and is used as the blank. Transmission detectors are photomultiplier tube or semiconductors. The glass sample holder is an alumina ring with two sapphire windows. Measurements were performed at two different thicknesses of 1 mm and 2 mm. The absorption coefficient is therefore calculated from the two recorded transmission spectra.

The absorption coefficient (KA) of the above two low-iron glass compositions, XCL without the nickel component (Composition of the prior art) and XCL-Ni with a low level of nickel (Composition of the present invention) was measured at wavelengths from 250 nm to 2800 nm. The absorption coefficient was measured as per above described method, as a function of the wavelength, at room temperature (FIG. 1A) and at 1200° C. (FIG. 1B). FIG. 1B further shows the emissivity gradient ($dE_\lambda/dT$) of a black body as a function of the same wavelengths at the same temperature of 1200° C. Only the shape of this latter curve is important for the purpose of illustration, and the values in FIG. 1B are normalized to the maximum of the function $dE_\lambda/dT$.

It can be seen in FIG. 1A wherein the absorption coefficients of the glass compositions were measured at room temperature at different wavelengths, that the prior art composition XCL exhibits the strong absorption band centered around 1000 nm due to $Fe^{2+}$. The XCL-Ni composition of the present invention exhibits several intense absorption bands in the visible range but also several peaks in the infrared spectrum centered around 1000 and 2000 nm. These peaks explain the slightly higher IR absorption of the nickel comprising glass composition at room temperature compared to the prior art composition.

FIG. 1B illustrates the surprising benefit of the composition of the present invention. Compared to the reference (XCL, the composition of the prior art), the absorption in the visible range of the composition of the present invention (XCL-Ni) decreases at high temperature, but strongly increases in the infrared (above 1700 nm), which is highly beneficial to improve the absorption of the radiations emitted in the furnace.

As illustrated below in FIGS. 1A and 1B, it has been surprisingly found that the composition of the present invention advantageously absorbs radiations emitted by the flames and re-emitted by the refractories in the furnace. Indeed, the composition of the present invention comprising a low amount of nickel, exhibits absorption bands in the infrared wavelengths at high temperature which match the emissivity gradient of the energy furnace assimilated herein to a black-body (FIG. 1B).

Using equation II and the values of the absorption coefficients, $\kappa_\lambda$, extracted from FIG. 1B, the radiative thermal conductivity coefficient, $k_r$, has been calculated for low-iron glass compositions characterized by different levels of iron content and different levels of nickel content.

The relative radiative thermal conductivity, $Rk_r$, has been calculated using equation II (above). The absorption coefficients, $\kappa_\lambda$, for iron and nickel were derived from an optical model calibrated on the measured absorption curves at room temperature and 1200° C. from FIGS. 1A and 1B. The $k_r$ values are normalized to the glass containing 1000 ppm $Fe_2O_3$ without nickel, to obtain the relative radiative thermal conductivity, $Rk_r$.

Figure 2:
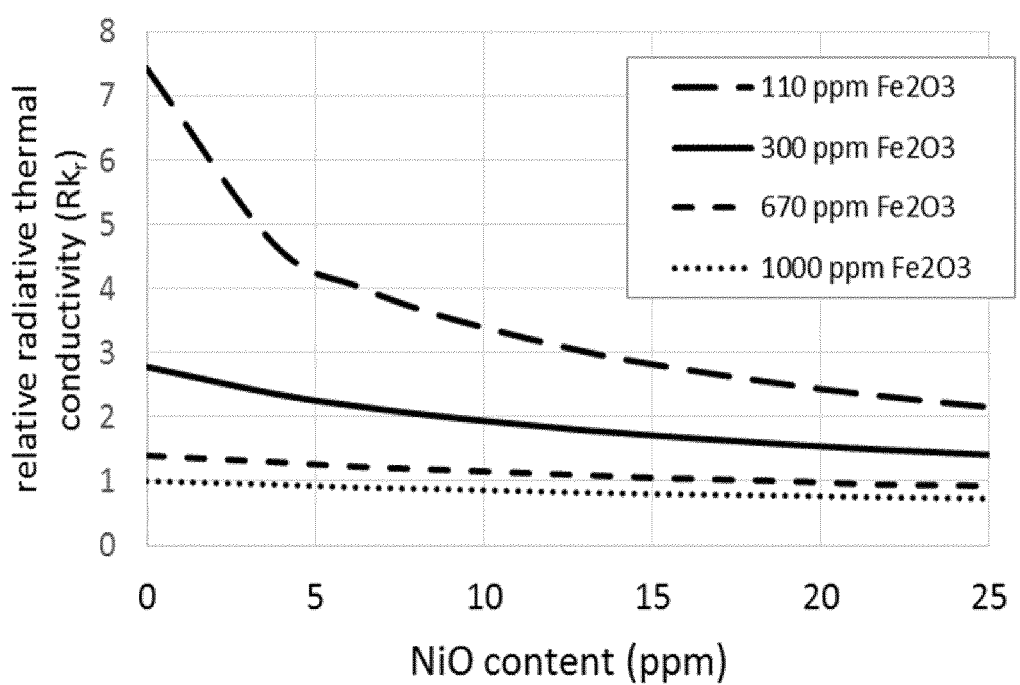
FIG. 2 illustrates graphically the impact of the addition of a nickel component to low-iron compositions to reduce the relative radiative thermal conductivity coefficient, $Rk_r$. The glass composition used for normalization ($Rk_r$=1) is 1000 ppm $Fe_2O_3$ (total iron content) and 0 ppm NiO.

FIG. 2 shows the benefit of the addition of nickel to low-iron compositions to reduce the relative radiative thermal conductivity coefficient, $Rk_r$. FIG. 2 illustrates that the impact of the addition of nickel to a glass composition on the radiative conductivity is stronger for compositions with a lower iron content. It further illustrates that the first few ppm of nickel are the most effective in lowering the relative radiative thermal conductivity coefficient. Increasing the level of nickel above 0.002% by weight of the total glass composition provides no significant incremental benefit.

Figure 3:
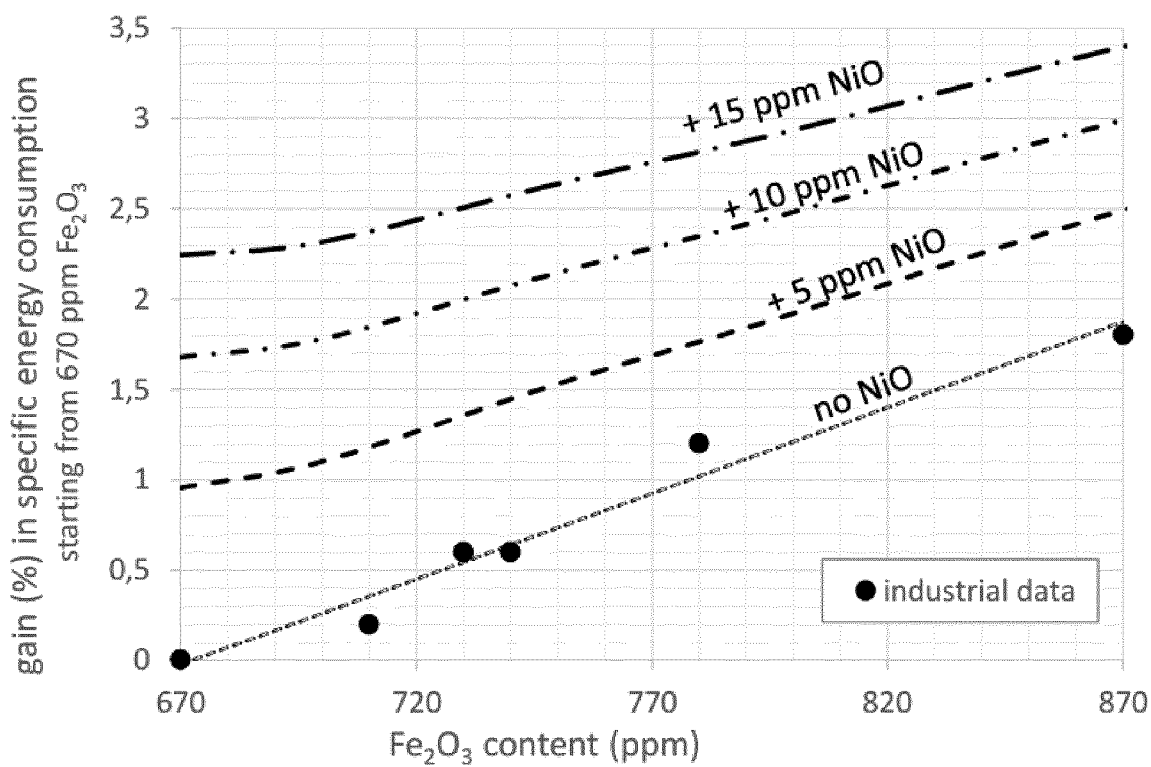
FIG. 3 shows the gain in specific energy consumption in % obtained with glass compositions enriched in iron or nickel, starting from a base glass with 670 ppm $Fe_2O_3$ Black dots are industrial data recording the gain in specific energy consumption with progressive addition of $Fe_2O_3$ starting from 670 ppm $Fe_2O_3$. Dotted curves above black dots are calculated gain in specific energy for glasses comprising a nickel component at levels of 5, 10 and 15 ppm NiO, for glass compositions with a total iron content ranging between 670 to 870 ppm.

Computational fluid dynamic models of glass furnaces usually use the radiative thermal conductivity approximation as per herein calculated. Data from FIG. 2 can therefore be used by glass technologists to estimate an energy gain in function of the amount of nickel added to the melt versus a given amount of iron. FIG. 3 shows an alternative estimation based on industrial data, reporting the variation in specific consumption (in percent) per amount of iron.

Industrial data have been collected on the energy gains of silicate-based glass compositions at different levels of iron content: please refer to the points pictured in FIG. 3. These industrial data report the gain in the specific energy consumption (i.e. energy decrease) with the increase of the $Fe_2O_{3\ tot}$ content, starting from a composition with an initial content of 670 ppm $Fe_2O_{3\ tot}$. From these industrial data obtained at different amounts of iron, it is possible to calculate the thermal conductivity coefficient $k_r$ and therefore to obtain a function $f$ linking a decrease in $k_r$ with a gain in the specific consumption. Further, based on the measured $\kappa_\lambda$ of FIG. 2, it is possible to calculate $k_r$ for glass compositions containing both nickel and iron and applicate the same function $f$ to convert the $k_r$ of these glass compositions to a gain in specific energy consumption, as illustrated in FIG. 3. Indeed, FIG. 3 shows the energy gains obtained with glass compositions comprising various nickel addition (5, 10 and 15 ppm NiO) that are calculated for glass compositions with a total iron content ranging between 670 and 870 ppm. In a glass composition comprising with 670 ppm $Fe_2O_3$ tot, 5 ppm NiO would allow a decrease of about 1% in specific energy consumption, which is really significant in the present field of glass melting. The addition of 10 ppm to 15 ppm NiO to the same glass composition would provide a gain in specific energy consumption of 1.7% and 2.2%, respectively. For glass compositions with higher iron content, the gain per ppm NiO is lower but still substantial. In glass compositions comprising 870 ppm $Fe_2O_3$ tot, the addition of 5 ppm to 15 ppm NiO would give a gain in specific energy consumption of 0.7% to 1.5%, respectively.

In a preferred embodiment, the glass composition of the present invention further comprises cobalt, preferably at a level of 0.00005% to 0.0020%, expressed as CoO, more preferably 0.00005% to 0.0015% by weight. Indeed, it has been found that the addition of nickel, even at the low levels required by the present invention can slightly affect the optical properties, such as the color of the final product. Depending on the targeted application/use, this can be an issue or not. If required, the yellow color imparted by nickel can be easily neutralized by cobalt addition.

In another embodiment, the glass composition of the present invention, further comprises chromium, preferably at a level of % 0.0001% to 0.0025%, expressed in $Cr_2O_3$, more preferably 0.0001% to 0.002% by weight. Indeed, it has been found that the addition of chromium to the glass composition of the invention can provide similar benefits than the addition of nickel in that it allows to reduce the radiative thermal conductivity of the corresponding glass composition but in a less efficient way than nickel.

In a preferred embodiment, the glass composition of the present invention is exempt of selenium. By exempt of selenium, herein it is meant a glass composition with selenium, expressed as Se, <3 ppm, preferably <2 ppm. In a more preferred embodiment, the glass composition of the present invention does not comprise selenium and cobalt in combination.

The glass composition according to the invention is made of glass which can belong to various categories. The glass can be, for example, a glass of soda-lime-silica, alumino-silicate or borosilicate-type, and the like.

Further to iron and nickel, the glass composition of the present invention comprises the following components in weight percentage, expressed with respect to the total weight of the glass composition:

| | |
|---|---|
| $SiO_2$ | 50-85% |
| $Al_2O_3$ | 0-30% |
| $B_2O_3$ | 0-20% |
| $Na_2O$ | 0-25% |
| CaO | 0-25% |
| MgO | 0-15% |
| $K_2O$ | 0-20% |
| BaO | 0-20% |

In a preferred embodiment, the glass composition of the present invention comprises the following components in weight percentage, expressed with respect to the total weight of the glass composition:

| | | More preferably |
|---|---|---|
| $SiO_2$ | 50-78% | 55-78% |
| $Al_2O_3$ | 0-18% | 0-18% |

-continued

|  | More preferably |
| --- | --- | --- |
| $B_2O_3$ | 0-18% | 0-18% |
| $Na_2O$ | 0-20% | 5-20% |
| CaO | 0-25% | 0-15% |
| MgO | 0-10% | 0-10% |
| K2O | 0-10% | 0-10% |
| BaO | 0-5% | 0-5% |

Preferred compositions of the present invention, especially useful for glass sheets and hollow glass articles are of the soda-lime-silica-type. Advantageously, according to this preferred embodiment, the composition comprises the following components in weight percentage, expressed with respect to the total weight of the glass composition:

| $SiO_2$ | 60-75% |
| --- | --- |
| $Al_2O_3$ | 0-6% |
| $B_2O_3$ | 0-4% |
| $Na_2O$ | 5-20% |
| CaO | 0-15% |
| MgO | 0-10% |
| $K_2O$ | 0-10% |
| BaO | 0-5% |

Other preferred glass compositions of the present invention, especially useful for glass fiber applications comprise the following components in weight percentage, expressed with respect to the total weight of the glass composition:

| $SiO_2$ | 50-75% |
| --- | --- |
| $Al_2O_3$ | 10-30% |
| $B_2O_3$ | 0-20% |
| $Na_2O$ | 0-5% |
| CaO | 0-25% |
| MgO | 0-15% |
| $K_2O$ | 0-5% |
| BaO | 0-5% |

Illustrations of glass compositions, in accordance with the invention, known as applicable for glass fibers are shown in the following table:

|  | Illustration 1 | Illustration 2 | Illustration 3 |
| --- | --- | --- | --- |
| $SiO_2$ (%) | 59-61 | 52-56 | 64-66 |
| $B_2O_3$ (%) | — | 5-10 | — |
| $TiO_2$ (%) | — | 0-0.8 | — |
| $Fe_2O_3$ (%) | 0.05-0.1 | 0.05-0.1 | 0.002-0.1 |
| $Al_2O_3$ (%) | 12.5-13.5 | 12-16 | 24-26 |
| CaO (%) | 21.5-22.5 | 16-25 | 0-0.3 |
| MgO (%) | 2.7-3.3 | 0-5 | 9-11 |
| $Na_2O$ (%) | 0.03-0.05 | 0-2 | 0-0.3 |
| $K_2O$ (%) | 0.25-0.60 | included in $Na_2O$ | included in $Na_2O$ |

The glass compositions of the invention are of particular interest when used to make glass articles, in particular hollow glass articles, glass sheets and/or glass fibers. Hollow glass articles can be glass bottles, glass flasks, glass jars, . . . . Glass fibers are glass in fibrous form used in making various products (such as glass wool for insulation) and is usually consisting of matted fine glass fibers.

In a preferred embodiment, the present invention relates to a hollow glass article made from a composition of the present invention.

In an alternative preferred embodiment, the present invention relates to a glass fiber made from the glass composition of the present invention.

Typically, the method for manufacturing glass comprises the steps of (i) melting a starting material batch that includes a mixture of a glass starting material and/or glass cullet in a glass melting furnace/tank; and then forming the molten glass into the desired shape. The step of melting includes providing heat to the starting materials or cullet through radiative transfer to reach fusion/melt. Generally, the heat is generated by burners using fossil fuel (i.e. natural gas) firing with pre-heated air.

For example, for forming fibers, the molten glass can be continuously drawn from a bushing. For forming hollow glass like bottles, the molten glass is put into a mould, and the glass is then molding into a glass bottle body through blowing technology. A glass sheet can be obtained by a floating process, a drawing process, a rolling process or any other process known to manufacture a glass sheet starting from a molten glass composition. In an embodiment according to the invention, the glass sheet is a float glass sheet. The term "float glass sheet" is understood to mean a glass sheet formed by the float glass process, which consists in pouring the molten glass onto a bath of molten tin, under reducing conditions.

The invention relates also to the use of nickel to reduce energy consumption during the melting step of a glass composition according to the invention.

Embodiments of the invention will now be further described, by way of examples. The following examples are provided for illustrative purposes and are not intended to limit the scope of this invention.

EXAMPLES

For the preparation of glass compositions of examples: Powder raw materials were mixed together and placed in melting crucibles, according to each composition specified below. The raw material mixture was then heated up in an electrical furnace to a temperature allowing complete melting of the raw material.

The following glass compositions were made in accordance with the invention. These glass compositions are especially suitable to be used as glass sheets or hollow glass articles.

|  | 1 | 2 | 3 | 4 | 5 | 6 | 7 | 8 |
| --- | --- | --- | --- | --- | --- | --- | --- | --- |
| $SiO_2$ (%) | 72.2 | 72.2 | 72.3 | 72.2 | 72.2 | 72.2 | 72.2 | 72.3 |
| $Al_2O_3$ (%) | 0.62 | 0.63 | 0.61 | 0.62 | 0.62 | 0.61 | 0.62 | 0.61 |
| $Fe_2O_3$ (%) | 0.075 | 0.077 | 0.074 | 0.074 | 0.074 | 0.074 | 0.074 | 0.073 |
| CaO (%) | 8.89 | 8.91 | 8.85 | 8.87 | 8.84 | 8.87 | 8.86 | 8.67 |
| MgO (%) | 4.28 | 4.26 | 4.29 | 4.30 | 4.30 | 4.29 | 4.30 | 4.21 |

-continued

|  | 1 | 2 | 3 | 4 | 5 | 6 | 7 | 8 |
|---|---|---|---|---|---|---|---|---|
| Na$_2$O (%) | 13.50 | 13.53 | 13.46 | 13.48 | 13.50 | 13.50 | 13.52 | 13.44 |
| K$_2$O (%) | 0.06 | 0.06 | 0.06 | 0.06 | 0.06 | 0.06 | 0.06 | 0.06 |
| Ni (ppm) | 4 | 5 | 9 | 13 | 3 | 6 | 6 | 8 |
| Co (ppm) | — | — | — | — | 0.75 | 1.5 | 2.5 | 3.5 |

The invention claimed is:

1. A glass composition comprising the following components in weight percentage, expressed with respect to the total weight of the glass composition:

| | |
|---|---|
| SiO$_2$ | 50-85% |
| Al$_2$O$_3$ | 0-30% |
| B$_2$O$_3$ | 0-20% |
| Na$_2$O | 0-25% |
| CaO | 0-25% |
| MgO | 0-15% |
| K$_2$O | 0-20% |
| BaO | 0-20% |
| Fe$_2$O$_3$ total | 0.002-0.1% | wherein the glass composition further comprises nickel, expressed as NiO, at a level of 0.0005% to 0.0020% by weight.

2. The glass composition according to claim 1, comprising the following components in weight percentage, expressed with respect to the total weight of the glass composition:

| | |
|---|---|
| SiO$_2$ | 55-78% |
| Al$_2$O$_3$ | 0-18% |
| B$_2$O$_3$ | 0-18% |
| Na$_2$O | 5-20% |
| CaO | 0-15% |
| MgO | 0-10% |
| K$_2$O | 0-10% |
| BaO | 0-5%. |

3. The glass composition according to claim 2, comprising the following components in weight percentage, expressed with respect to the total weight of the glass composition:

| | |
|---|---|
| SiO$_2$ | 60-75% |
| Al$_2$O$_3$ | 0-6% |
| B$_2$O$_3$ | 0-4% |
| Na$_2$O | 5-20% |
| CaO | 0-15% |
| MgO | 0-10% |
| K$_2$O | 0-10% |
| BaO | 0-5%. |

4. The glass composition according to claim 1, wherein the nickel, expressed as NiO, is at a level ≤0.0018% by weight.

5. The glass composition according to claim 1, wherein the Fe$_2$O$_3$ total is at a level of 0.002% to 0.06% by weight.

6. The glass composition according to claim 1, wherein the Fe$_2$O$_3$ total is at a level of 0.002% to 0.04% by weight.

7. The glass composition according to claim 1, wherein the Fe$_2$O$_3$ total is at a level of 0.002% to 0.02% by weight.

8. The glass composition according to claim 1, further comprising cobalt.

9. The glass composition according to claim 1, further comprising cobalt, expressed as CoO, at a level of 0.00005% to 0.0020%.

10. The glass composition according to claim 1, further comprising cobalt, expressed as CoO, at a level of 0.00005% to 0.0015% by weight.

11. The glass composition according to claim 1, further comprising chromium.

12. The glass composition according to claim 11, wherein the chromium, expressed as Cr$_2$O$_3$, is at a level of 0.0001% to 0.0025% by weight.

13. The glass composition according to claim 11, wherein the chromium, expressed as Cr$_2$O$_3$, is at a level of 0.0001% to 0.002% by weight.

14. The glass composition according to claim 1, wherein the glass composition does not contain TiO$_2$.

15. A glass article, made from the glass composition according to claim 1.

16. The glass article according to claim 15, which is in the form of a hollow glass article.

17. The glass article according to claim 15, which is in the form of a glass sheet.

18. The glass article according to claim 15, which is in the form of a glass fiber.

19. The glass composition according to claim 1, wherein the glass composition contains less than 3 ppm Se.

20. A melting process for making a glass composition comprising the following components in weight percentage:

| | |
|---|---|
| SiO$_2$ | 50-85% |
| Al$_2$O$_3$ | 0-30% |
| B$_2$O$_3$ | 0-20% |
| Na$_2$O | 0-25% |
| CaO | 0-25% |
| MgO | 0-15% |
| K$_2$O | 0-20% |
| BaO | 0-20% |
| Fe$_2$O$_3$ total | 0.002-0.1% | comprising adding nickel, expressed as NiO, at a level of 0.0005% to 0.0020% by weight, during the melting process.

* * * * *